Aug. 2, 1966   H. V. HENDERSON   3,263,626
DRIVES FOR OVERHEAD HAULAGE VEHICLES
Filed July 6, 1965   2 Sheets-Sheet 1

INVENTOR

HERBERT VICTOR HENDERSON

By Shoemaker and Mattare

Attys.

FIG. 2
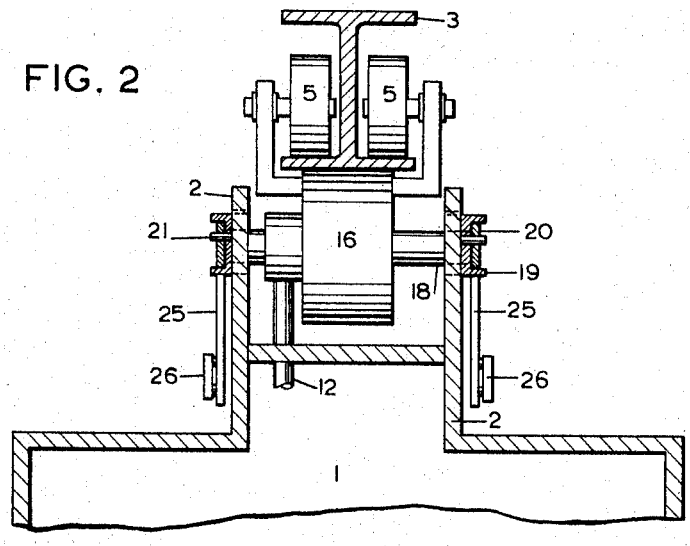
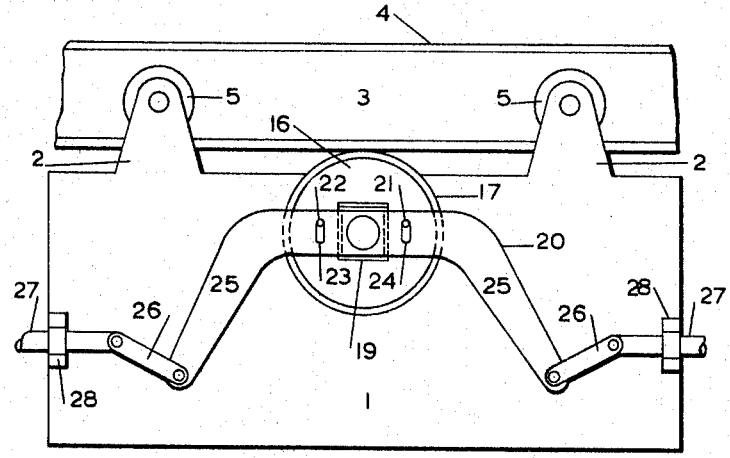
FIG. 3
INVENTOR
HERBERT VICTOR HENDERSON
By Shoemaker and Mattare
Attys.

United States Patent Office 3,263,626
Patented August 2, 1966

3,263,626
DRIVES FOR OVERHEAD HAULAGE VEHICLES
Herbert V. Henderson, Germiston, Transvaal, Republic of South Africa, assignor to Anglo-Transvaal Consolidated Investment Company Limited, Johannesburg, Transvaal, Republic of South Africa
Filed July 6, 1965, Ser. No. 469,542
Claims priority, application Republic of South Africa, July 10, 1964, 64/3,270
6 Claims. (Cl. 105—73)

This invention relates to drives for overhead haulage vehicles and more particularly to locomotives coupled to propel one or more carriages or tubs with the train suspended from an overhead track.

It will be appreciated that it is desirable to drive locomotives such as those above referred to with sufficient adhesion between the driving wheels and rails to propel the load at a given time and under the particular existing circumstances without slippage between drive wheels and rails while at the same time not applying unnecessarily large pressures to the drive wheels.

The object of the present invention is to provide a drive arrangement for such vehicles wherein the pressure applied by the drive wheels to the rails will vary automatically with the load to be moved.

According to this invention there is provided a locomotive adapted to be suspended from an overhead track said locomotive comprising a rigid frame having track engaging wheels to be positioned on opposite sides of the supporting track, a wheel support for at least one wheel mounted on and movable in relation to the frame, a cranked link having one arm carrying said wheel support and pivotable about a point off-set horizontally from the wheel axis, and the other arm connected to the draw-bar for the locomotive, and a drive for at least one of the wheels.

The invention also provides for the cranked link and wheel support to be duplicated on both sides of the wheel axis and for the pivoted arm of the cranked link to be slotted to allow pivotal movement about either pivot point.

A preferred embodiment of this invention will be described with reference to the accompanying drawings in which:

FIGS. 2 and 3 are diagrammatic representations illustrating the operation of this invention.

Figure 1:
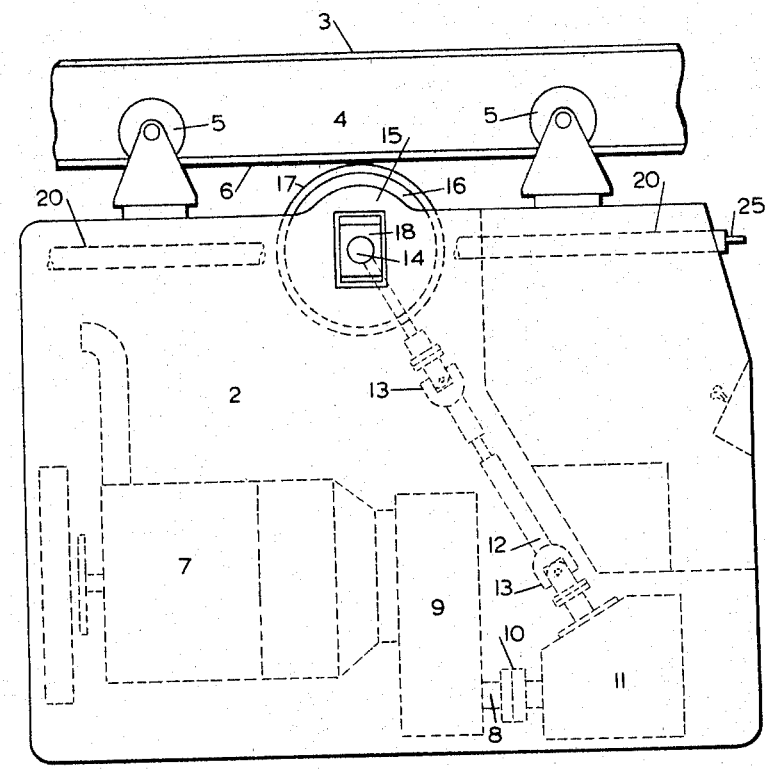
FIG. 1 is a general diagrammatic view of a locomotive.

It will be appreciated that the monorail locomotive illustrated in FIG. 1 is only one form of locomotive suitable for use with the present invention. Other constructions may be used provided either the drive or running wheels and the draw-bar are supported by but movable relative to the locomotive frame in the manner set forth above.

Briefly then with regard to FIG. 1 a practical form of locomotive 1 comprises a rigid frame 2 suspended from a track 3 which may conveniently be in the form of an I beam 4. The frame 2 is supported from two pairs of running wheels 5 which wheels are rotatably mounted on axles located towards the ends of the frame which axles will preferably be secured to the frame 2 in any convenient manner in swivel mountings which ensures that no longitudinal or vertical displacement of these wheels 5 relative to the frame 2 can take place.

As shown the wheels 5 run on the upper surfaces of the lower flanges 6 of I beam 4.

The frame 2 also houses the prime mover for the locomotive which may be a diesel engine 7 illustrated by the dotted lines representation and the drive 8 from this engine is connected either directly or through a torque converter 9 by a coupling 10 to a suitable reduction gearing unit 11. The output from the unit 11 is connected by means of an extensible drive shaft 12 and universal joints 13 to the shaft 14 of a single drive wheel assembly 15.

The assembly 15 is mounted in the frame 2 so that drive wheel 16 engages the undersurface of flanges 6 of I beam 4. The wheel 16 is preferably provided with a resilient tyre 17 made of material which will promote frictional engagement between wheel 16 and flange 6.

The drive wheel 16 is located in a central position relative to the running wheels 5 and the axle therefor is supported in bearing blocks 18.

The locomotive frame 2 also embodies an operator's cab with the necessary controls for operation of the locomotive.

Spring means (not illustrated) may be incorporated in the assembly to ensure that a certain minimum pressure is applied to the wheel supports to ensure engagement between tyre 17 and the track surface.

The lowest position of the drive wheel 16 is made to afford sufficient adhesion to drive at least the locomotive on its own without any load such as a train of carriages or tubs.

Referring now more particularly to FIGS. 2 and 3 of the diagrammatic drawings it will be seen that each bearing block 18 carries a wheel support 19.

The drive wheel support 19 is fixed to a rigid link 20 which in turn is mounted on a pair of pivots 21, 22 fixed in relation to the frame 2 and located equi-distantly one on each side of the wheel axis. The rigid link 20 has vertical slots 23, 24 formed therein so that the link 20 and consequently the drive wheel 16, may be pivoted to a predetermined limited extent about either fixed pivot point 21, 22.

Each end 25 of the rigid link is inclined downwardly and has a further short link 26 rotatably attached thereto. These short links 26 are inclined upwardly at angles of approximately 30° to the horizontal and the outer ends are rotatably secured to draw-bars 27 in guides 28 for the locomotive. The draw-bars 27 are suitably mounted to allow a limited movement thereof longitudinally with respect to the locomotive frame 2.

When the load is coupled to one or other of the draw-bars 27 and the locomotive 1 driven in a direction away from this coupling point it will be appreciated that there will be a rotational movement of the rigid wheel supporting link 20 about the pivot mounting remote from the load coupling. The slot 23 or 24 in the link 20 at the other pivot mounting will enable this movement to take place and as the pivot point is off-set from the wheel axis the drive wheel 16 will be forced into tighter engagement with the track surface thereby affording increased adhesion between driving wheel 16 and track 3 to move the load coupled to the locomotive 1.

The ratio of the force applied by the load will be in relation to the length of the link coupling the draw-bar to the rigid wheel supporting link.

It will be appreciated that the linkage and pivot assembly above described will preferably be duplicated, one on each side of the plane of rotation of drive wheel 16. The draw-bars 27 will be bifurcated so that they may operate with each linkage system.

The position of the running and drive wheels relative to the track may be reversed if this is for any reason advantageous and there may be more than one drive wheel assembly if necessary to meet particular requirements.

What I claim as new and desire to secure by Letters Patent is:

1. A locomotive adapted to be suspended from an overhead track, said locomotive comprising a rigid frame having track engaging wheels relatively positioned for engagement against opposite sides of the supporting track, bearing blocks carried by and spaced apart transversely of said frame, means mounting said blocks thereon to have up and down movement relative thereto, one of said track engaging wheels being a drive wheel which is supported by said bearing blocks for rotation, an elongate link bar extending longitudinally of said frame substantially perpendicular to the rotational axis of said drive wheel and carried by one of said bearing blocks, means on the frame cooperating with said link bar for pivotally supporting the latter, said means being offset longitudinally of the frame from and on opposite sides of the rotational axis of the drive wheel, said link bar having a terminal arm portion extending angularly therefrom, a draw bar supported on the frame for reciprocal movement in a line substantially paralleling said link bar between the bar and the free end of the arm, a coupling link having one end pivotally connected to said free end of the arm and having an opposite end pivotally connected to the draw bar at a point on the draw bar removed from the end of the arm toward the near end of the frame, and a drive for said drive wheel.

2. The invention according to claim 1, wherein said means on the frame cooperating with said link bar for pivotally supporting the latter comprises pin members fixed relative to the frame and engaged in vertical slots in said link bar.

3. A locomotive adapted to be suspended from an overhead track, said locomotive comprising a rigid frame having opposite longitudinal sides and having track engaging wheels relatively positioned for engagement against opposite sides of the supporting track, bearing blocks carried by said opposite sides of the frame, means mounting said blocks thereon for up and down movement relative thereto, one of said track engaging wheels being a drive wheel which is supported by said bearing blocks for rotation, an elongate link bar at each side of the frame and extending longitudinally of the frame substantially perpendicular to the rotational axis of said drive wheel and carried by one of said bearing blocks, means upon each side of the frame cooperating with the adjacent link bar for pivotally supporting the latter, said means being offset longitudinally of the frame from and at opposite sides of the rotational axis of the drive wheel, said link bars each having a terminal arm portion extending angularly therefrom, a draw bar supported on the frame adjacent to each link bar arm for reciprocal movement in a line substantially paralleling the adjacent link bar between the adjacent link bar and the free end of the adjacent arm, a coupling link adjacent to each arm and having one end pivotally connected to the said free end thereof and having an opposite end pivotally connected to the adjacent draw bar at a point on the latter removed from the said free end of the adjacent arm toward the near end of the frame, and a drive for said drive wheel.

4. The invention according to claim 3, wherein the said means upon each side of the frame cooperating with the adjacent link bar for pivotally supporting the latter comprises a pair of pin members fixed to the adjacent side of the frame and engaged in vertical slots in the adjacent link bar.

5. The invention according to claim 4, wherein each link bar has another arm portion which extends angularly from the opposite terminus thereof, said arm portions of each link bar being approximately the same length and extending in opposite directions from the associate link bar, a draw bar supported on the frame upon each side thereof for reciprocal movement in alignment with the adjacent first mentioned draw bar, and a coupling link adjacent to each of the second mentioned arm portions and having one end pivotally connected to the said free end of the latter and having an opposite end pivotally connected to the adjacent draw bar at a point on the latter removed from the end of the adjacent arm portion toward the near end of the frame.

6. The invention according to claim 5, wherein each of said link bars extends in a line substantially intersecting the rotational axis of the drive wheel.

References Cited by the Examiner

UNITED STATES PATENTS

| 2,018,087 | 10/1935 | Plass | 105—153 |
| 2,063,471 | 12/1936 | Stedfeld | 74—330 |
| 2,655,871 | 10/1953 | Mazzola | 105—30 |

FOREIGN PATENTS

| 432,859 | 11/1924 | Germany. |
| 146,161 | 3/1931 | Switzerland. |

ARTHUR L. LA POINT, *Primary Examiner.*

B. FAUST, D. HOFFMAN, *Assistant Examiners.*